Dec. 5, 1944.   M. DE SIMO ET AL   2,364,583
CATALYTIC CONVERSION
Filed Oct. 19, 1943
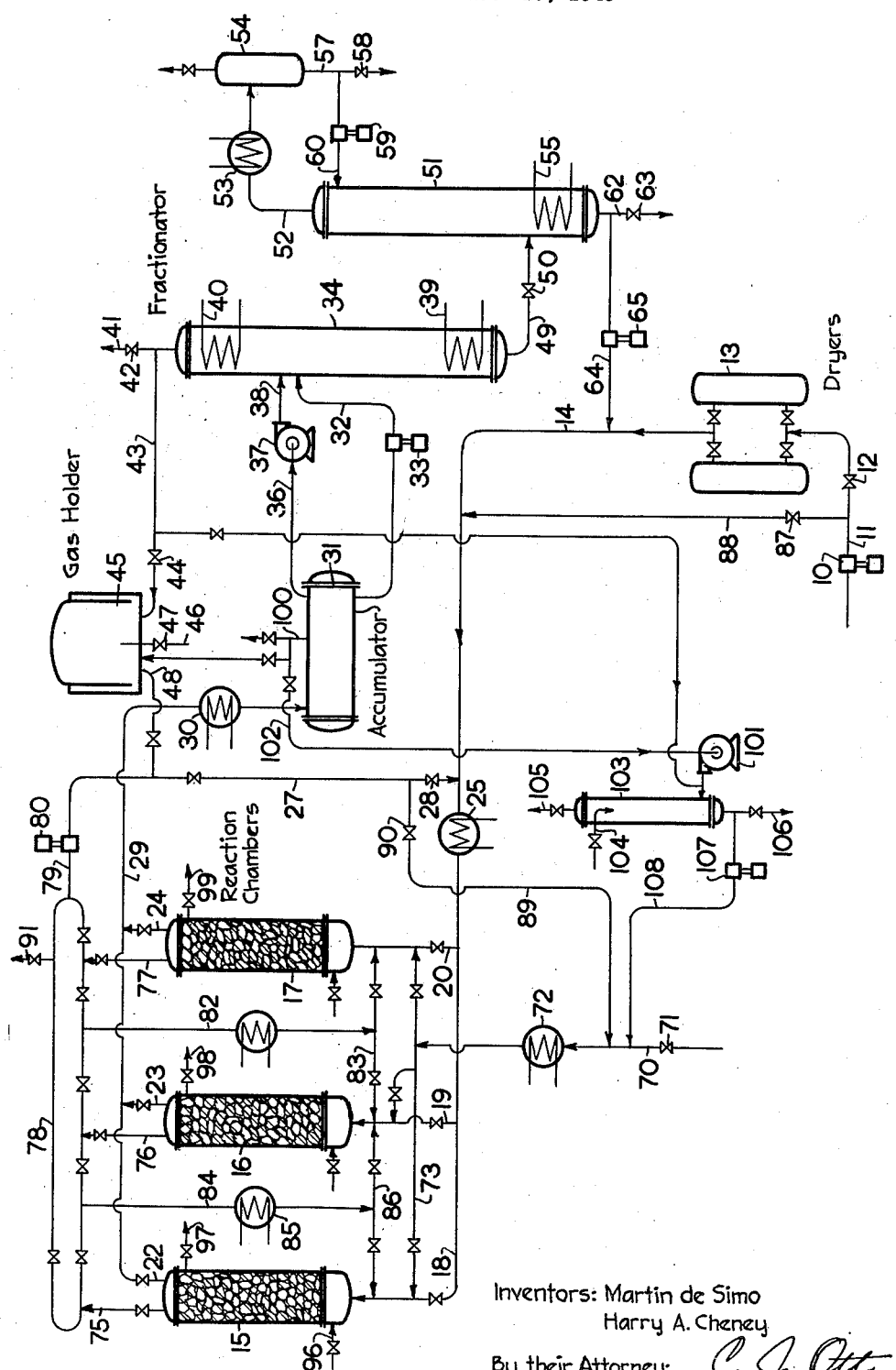
Inventors: Martin de Simo
Harry A. Cheney
By their Attorney: C. J. Ott Patented Dec. 5, 1944

2,364,583

UNITED STATES PATENT OFFICE 2,364,583

CATALYTIC CONVERSIONS

Martin de Simó, Chicago, Ill., and Harry A. Cheney, Oakland, Calif., assignors to Shell Development Company, San Francisco, Calif., a corporation of Delaware Application October 19, 1943, Serial No. 506,910

11 Claims. (Cl. 260—683.5)

This invention relates to improvements in processes wherein conversions are effected with the aid of aluminum halide catalysts.

An object of the present invention is the provision of an improved and highly economical process for the execution of catalytic reactions with the aid of aluminum halide catalysts in the presence of an anhydrous hydrogen halide promoter wherein the promoter is produced in the anhydrous state within the system. Another object of the invention is the provision of an improved process for isomerizing hydrocarbons in the vapor phase. Other objects of the invention will become apparent from the following description thereof.

Friedel-Crafts type catalysts such as, for example, the aluminum halides, find application in the execution of a wide variety of catalytic reactions. The aluminum halides are generally employed in combination with a carrier or supporting material to produce a catalyst having a fixed physical shape better adapted for use in vapor phase operations. Although a great many inert support materials may be used, the more active catalysts are obtained by combining the aluminum halide with certain adsorptive materials which materially enhance its catalytic activity. The adsorptive materials which possess the ability to improve the activity of the aluminum halides and are most desired for the preparation of the catalysts are often of limited availability and are frequently relatively costly. In order to operate processes using these supported catalysts commercially, it is therefore highly desirable, and in many cases essential, to recover the adsorptive carrier and regenerate the catalyst when catalyst activity has fallen below an optimum practical value.

In order to recover the spent catalyst comprising, for example, anhydrous aluminum chloride and an adsorptive material such as adsorptive alumina, and regenerate or reactivate it for re-use, several methods may be used. According to one method, the catalyst is simply impregnated with fresh amounts of aluminum chloride. Although this treatment improves the activity of the catalyst, the catalysts reactivated in this way do not always retain their activity well. Certain spent catalysts may be improved somewhat by extraction with appropriate organic solvents. This treatment is sometimes beneficial to catalysts which are visibly discolored, but does not usually effect any substantial improvement. Spent catalysts have also been regenerated by removing the old aluminum chloride by solution and reimpregnating the recovered material with fresh aluminum chloride. Thus, spent catalysts have been treated with water to dissolve out the aluminum chloride. However, this treatment is very detrimental to a great many of the more desirable adsorptive carrier materials and generally causes their disintegration. Since the reaction of the aluminum chloride in the spent catalyst with water is quite violent and generates considerable heat, and since this was considered the likely cause for the disintegration of the carrier, it has been attempted to dissolve out the aluminum chloride with a material that reacts with aluminum chloride with less vigor. Thus, the spent catalyst has been treated with hydrochloric acid solutions. This, however, is no appreciable improvement over the action of water. Spent catalysts have also been treated with organic liquids such as ketones, alcohols, ethers, etc. Such treatments are very expensive and do not, in general, effect a satisfactory recovery of the carrier.

In co-pending application Serial Number 414,634, now U. S. Patent 2,339,685 of which the present application is a continuation-in-part, it has been shown that the adsorptive support of the aluminum halide catalysts can be recovered efficiently in situ, not only without disintegration or loss of its ability to promote the catalytic activity of the aluminum halides, but with the simultaneous recovery of the halogen content of the catalyst in the form of anhydrous hydrogen halide. In accordance with the present invention, the treatment of the spent catalyst is effected as an integral step of an improved and highly economical catalytic process for the execution of catalytic reactions with the aid of aluminum halide catalysts.

The effectiveness of these catalysts in catalyzing many reactions, particularly the hydrocarbon isomerization reaction, is greatly enhanced by the presence of a hydrogen halide promoter. Often the presence of the promoter is essential to attain the yields, or permit the use of the operating conditions, which bring the large-scale operation of the process within the realm of practicability. Therefore, not the least among the factors which determine the degree of efficiency and economy with which these catalytic processes can be executed on a large scale is the cost of the promoter. The complete recovery of the hydrogen halide in the anhydrous state from the reaction products is not often possible and is seldom economically feasible by methods available heretofore. Anhydrous hydrogen halide from an outside source must therefore be added to the system. In the large-scale execution of these catalytic processes relatively large quantities of the hydrogen halide are required. Since the reactions carried out with the aid of these catalysts must generally be executed in the absence of water, the promoter must be obtained in substantially anhydrous form. The hydrogen halide is often not readily available in large quantities in the anhydrous form or, when available, the cost is often prohibitive. Separate process steps must then be resorted to in order to manufacture the promoter in the desired state of purity, or resort must be had to the purification or dehydration of the available less pure material. These steps as practiced heretofore contribute materially to the cost of the process.

In accordance with the improved process of the invention, the above difficulties are avoided and the spent catalyst may be regenerated in situ with simultaneous production within the system of the hydrogen halide promoter in the anhydrous state, thereby enabling the execution of the catalytic conversion not only with considerable saving in catalyst cost, but with the elimination of the need for an outside source of anhydrous promoter. These advantages are obtained in accordance with the present invention by treating the spent aluminum halide catalyst, preferably in situ, with water vapor under conditions substantially avoiding the hydration of aluminum halide. By careful control of the conditions under which the treatment is effected, the aluminum halide will react with water vapor with the formation of anhydrous hydrogen halide. The resulting hydrogen halide is passed in part, or in its entirety, to the reaction zone wherein the conversion reaction of the process is being carried out. When evolution of the anhydrous hydrogen halide from the catalyst has ceased, the recovered support material may be dried and reimpregnated with fresh aluminum halide to regenerate the catalyst.

The invention is applicable to the execution of catalytic reactions with the aid of any of a wide variety of catalytic materials comprising an aluminum halide, such as aluminum bromide and aluminum chloride, and a solid support comprising, for example, fire brick, silica stone, charcoal, pumice, etc. It is, however, of particular value in the execution of catalytic reactions employing catalysts comprising aluminum halide and adsorptive carrier materials such as the aluminous and/or siliceous adsorptive materials of natural or synthetic origin which can be regenerated with difficulty, and often not at all, by methods utilized heretofore without destroying at least to a substantial degree the valuable support material. A particularly active catalyst of the latter type comprises a combination of anhydrous aluminum chloride and adsorptive alumina. Suitable types of adsorptive alumina comprise any of the many forms of activated alumina and activated bauxites. For the purpose of convenience, the process in accordance with the invention is hereinafter discussed and illustrated with particular reference to a catalyst of this type.

The step of the process comprising the treatment of catalyst which has become spent during the course of the operation is effected by the passage of water vapor through an elongated bed of the spent catalyst comprising aluminum chloride and adsorptive alumina, care being taken to maintain a sufficiently high temperature and/or a sufficiently low partial pressure of water vapor to avoid the presence of any liquid water within the catalyst bed. Under these conditions the water vapor will react with the aluminum chloride in the catalyst with the formation of anhydrous hydrogen halide. Although temperatures considerably less than 100° C. may be used with corresponding pressures sufficiently low to avoid the presence of liquid water in the catalyst bed, best results, as determined by the degree of halogen recovery and quality of the recovered catalyst support, are obtained by effecting the treatment at atmospheric pressure and a temperature in excess of approximately 150° C., and preferably in the approximate range of 175° C. to 200° C. With no intention of being bound in any way by any theory as to why better results are achieved at these higher temperatures, it appears that in the presence of the hydrogen chloride gas the hexahydrate of the aluminum chloride is stable up to approximately 140° C. and a lower hydrate is stable at limited temperatures not exceeding approximately 175° C. The formation of these aluminum hydrates reduces the yield of anhydrous hydrogen chloride obtained and apparently presents difficulties in the subsequent regeneration of the catalyst.

The water vapor is preferably heated to a temperature in excess of 150° C., for example in the approximate range of 175° C. to 200° C., before passage into the catalyst bed. The invention is not limited to the heating of the water vapor to this elevated temperature prior to its entry into the catalyst bed, and lower temperatures may be used if desired. It is essential, however, that the water vapor entering and passing through the bed of catalyst material be dry and therefore superheated. Under these conditions the hydrolysis of the aluminum chloride takes place in a short but definite zone of the catalyst bed. This zone appears to move steadily through the length of the bed and at least 75% to 85% of the theoretically available hydrogen chloride can thus be obtained in the anhydrous state before any unreacted water vapor begins to appear in the hydrogen chloride produced. An even greater recovery can be obtained when using long beds of small cross-sectional area such as those contained in reaction tubes. The remainder of the halogen content of the catalyst bed, however, also can be recovered readily therefrom in the anhydrous state. To accomplish this result, the passage of the water vapor through the bed of spent catalyst material is continued until water vapor is detected in the gaseous reaction product. As soon as any water begins to appear in the hydrogen chloride produced, the gaseous reaction product is passed into a second bed of catalyst material. The stream thus passed to the second bed of spent catalyst material is heated in order to assure the presence of only superheated water vapor in the second bed of catalyst material. In passing through the second bed of spent catalyst, the stream is dehydrated and additional hydrogen chloride is produced by the reaction of the water vapor with aluminum chloride.

The water vapor used in the step of treating the spent catalyst may comprise a diluent material such as, for example, a gaseous hydrocarbon, air, etc. Aqueous hydrogen chloride may be used instead of water vapor, thereby increasing the yield of anhydrous hydrogen chloride.

When evolution of hydrogen chloride in the anhydrous state from the spent catalyst ceases, the recovered support material comprising the original alumina, alumina formed as a result of the reaction of aluminum chloride with water vapor, water vapor, and small amounts of aluminum chloride hydrates, may be subjected to a treatment to regenerate the catalyst. This treatment may, if desired, be effected in situ and may comprise, for example, the heating of the recovered support material in the absence of water vapor at an elevated temperature in excess of, for example, approximately 200° C., to substantially dehydrate the catalyst material and effect the decomposition of any aluminum chloride hydrates which may be present. The resulting dehydrated material is then reimpregnated with aluminum chloride by the passage of aluminum chloride vapors therethrough in situ.

The spent catalyst treating step of the process of the invention permits the recovery of the adsorptive support in situ in the absence of substantial physical disintegration and without impairing the characteristics of the support material which enable it to function as a promoter for the aluminum chloride. Adsorptive alumina recovered in this manner is found to adsorb as much aluminum chloride as the original material, and the catalyst regenerated by reimpregnating the recovered adsorptive alumina is found to possess a catalytic activity fully as effective and as stable as the original catalyst. It is to be pointed out that in this method of recovering the catalyst support, aluminum is not removed from the catalyst but is retained therein, after the recovery and regenerative operation, in the form of alumina. It is believed that the formation of this alumina in the support material may well contribute to the enhanced characteristics of the catalyst treated and regenerated in accordance with the method of the invention.

The high degree of efficiency attainable with respect to anhydrous hydrogen chloride production, adsorptive support recovery and catalyst regeneration during the catalyst treating step of the process are illustrated by the following examples.

Example I 4300 grams of adsorptive alumina impregnated with 19.2% of anhydrous aluminum chloride were placed in a vertical reaction vessel having a diameter of 5 inches and a height of 15 inches. The catalyst was preheated to a temperature of 170° C. Superheated water vapor at a temperature of 200° C. was passed upwardly through the vessel at atmospheric pressure. A sharply defined reaction zone marked by a temperature rise of about 70° C. slowly ascended the catalyst bed and anhydrous hydrogen chloride was eliminated from the upper end of the reaction vessel. After three hours of operation, water suddenly appeared in the exit gas and the treatment was stopped. Examination of the catalyst showed that the aluminum chloride content of all but the uppermost layer of the catalyst had been reduced to less than 3%. The recovered alumina retained its original appearance and hardness.

The recovered alumina was dried at a temperature of 375° C. and re-impregnated with anhydrous aluminum chloride to yield a catalyst containing 21% by weight of adsorbed aluminum chloride. Use of this regenerated catalyst in the isomerization of butane showed it to be fully as active as comparative catalysts made from fresh adsorptive alumina.

Example II 390 grams of catalyst consisting of activated alumina impregnated with aluminum chloride and containing 15% of aluminum chloride, which had been used for 2,300 hours of continuous operation as catalyst in the vapor phase isomerization of butane, were placed in an elongated reactor. The catalyst was heated and maintained at a temperature of 110° C., while a stream of butane gas saturated with water vapor at 20° C. was passed therethrough at atmospheric pressure and at the rate of 4.5 liters per hour. The operation was continued until 40% of the potentially available hydrogen chloride had been recovered from the catalyst in anhydrous form. No disintegration, softening, or other physical change was brought about in the alumina support.

Example III 218 grams of a spent catalyst consisting of adsorptive alumina impregnated with aluminum chloride were placed in an elongated reaction tube. The catalyst was heated and maintained at a temperature of 150° C., while a stream of air saturated with water vapor at 20° C. was passed therethrough at atmospheric pressure and at the rate of 10 liters per hour. The gaseous reaction product consisted of anhydrous hydrogen chloride. The operation was continued for a period of 60 hours before water appeared in the gaseous reaction product. At the end of this period, approximately 70% of the potentially available hydrogen chloride had been recovered from the catalyst without any apparent disintegration of the adsorptive alumina.

Example IV

The operation of Example III was repeated under identical conditions with the exception that the catalyst was maintained at a temperature of 190° C. This resulted in a recovery of 75% of the potentially available hydrogen chloride from the catalyst in a period of 30 hours without any apparent disintegration of the adsorptive alumina.

Example V

The adsorptive alumina recovered in the experiments of Examples III and IV were combined and dried at a temperature of 400° C. in the absence of air. The dried product was as hard and strong after the drying operation as fresh adsorptive alumina. This material was then impregnated with fresh anhydrous aluminum chloride until the resulting catalyst contained 20% of $AlCl_3$. Butane vapor, containing 3 mol per cent HCl, was passed over this catalyst at 100° C. and at a pressure of 160 lbs. The reactants were passed over the catalyst at the rate of 12 mols per liter of catalyst per hour. After three hours of operation, the reaction product was found to contain 50 mol per cent of isobutane.

In accordance with the invention the catalyst treatment is effected as a co-operative step of the process wherein the catalyst is used, thereby providing an improved and highly economical process for carrying out reactions with the aid of aluminum chloride catalysts and anhydrous hydrogen chloride promoters.

The advantages inherent in the improved process are several and important. The process provides a cheap source of the hydrogen chlorine promoter in the anhydrous state within the system. Since the treatment of the spent catalyst can be effected with vapors of aqueous hydrogen chloride instead of water vapor, any promoter added from an outside source, should the need therefor arise, can be introduced into the process in aqueous form and be dehydrated within the system itself as an integral part of the catalyst recovery operation. Generally, however, the process of the invention permits the production and recovery within the system of all of the promoter required for the continuance of the process. The process of the invention, furthermore, enables the substantially complete recovery of hydrogen halide from the reaction products by scrubbing with an absorbing medium such as water. Heretofore, such methods were prohibitive since the resulting hydrogen halide had to be dehydrated in a separate step prior to being recycled. Such dehydration is particularly costly when the promoter, such as hydrogen chloride, forms a constant boiling mixture with water. In the process of the invention, however, the aqueous hydrogen halide obtained in a scrubbing operation may be passed through the spent catalyst at the indicated conditions, whereby the promoter is not only dehydrated but additional promoter in anhydrous form is produced with simultaneous recovery of the catalyst support. A further advantage of the process of the invention lies in its ability to dehydrate a moisture-containing hydrocarbon charge while simultaneously producing the anhydrous promoter and effecting the recovery of the catalyst support, thereby eliminating the need for separate apparatus for drying the charge.

The process of the invention may be applied with advantage to the execution of a great many reactions which can be carried out with the aid of aluminum halide catalysts. However, for the purpose of setting forth more clearly the process of the invention, it will be described in detail herein in its application to the conversion of hydrocarbons, namely the isomerization of saturated hydrocarbons.

The following detailed description of the improved process is made with reference to the attached drawing, forming a part of this specification, and in which the single figure shows a more or less diagrammatic elevational view of one form of apparatus suitable for carrying out the improved process of the invention.

An isomerizable hydrocarbon, such as, for example, butane, is drawn from an outside source and forced by means of pump 10, through line 11, into a drying zone. The drying zone may consist of one or more chambers 13 containing a suitable dehydrating material such as, for example, activated alumina. From drier 13 the dried butane stream is passed through line 14 to a conversion zone. The conversion zone may suitably consist of a plurality of elongated interconnected reaction chambers 15, 16 and 17, permitting the passage of reactants in series, and in any desired order, through any number of the reaction chambers. Reaction chambers 15, 16 and 17 are provided with inlet lines 18, 19 and 20, respectively, for the reactants, and outlet lines 22, 23 and 24, respectively, for reaction products. Although but three reaction chambers are shown in the drawing, it is to be understood that a greater or lesser number of reaction chambers may be used.

A bed of a suitable aluminum halide isomerization catalyst such as, for example, aluminum chloride in combination with an active adsorptive material such as adsorptive alumina, is positioned within the reaction chambers. The butane charge is passed from line 14 into one or several of the reaction chambers, wherein it is contacted with the isomerization catalyst under conditions leading to the isomerization of the butane to isobutane. Suitable temperatures comprise a temperature up to approximately 200° C., and preferably in the approximate range of 90° C. to 150° C. The desired temperature conditions are maintained in the reaction chambers by suitable heating means such as, for example, a charge preheater 25 in line 14, and, if desired, additional heating means, not shown in the drawing, within or about the reaction chambers. Any suitable pressure permitting operation in the vapor phase may suitably be employed. Pressures in the approximate range of from 50 lbs. to 200 lbs. have been found to give excellent results.

The ability of the aluminum halides to catalyze the isomerization reaction is substantially increased by the presence of a hydrogen halide. In the process of the invention, anhydrous hydrogen chloride, obtained at least in its greater part within the system as described below, is introduced through line 27, controlled by valve 28, into the butane charge flowing through line 14 to the reaction chamber. The amount of hydrogen chloride introduced into the charge may vary widely in accordance with the nature of the catalyst used, operating conditions, etc. Thus, hydrogen chloride in an amount within the approximate range of from 0.3% to 25% of the butane charge may suitably be used. It is to be pointed out that the novel and efficient method of producing and recovering anhydrous hydrogen chloride within the system permits the maintenance of a high hydrogen chloride content within the reaction zone without thereby incurring the substantial increase in the cost of operation generally encountered when using such high promoter concentrations in the methods of operation utilized in processes available heretofore.

During the course of the operation the catalyst will decline in activity. For the purpose of illustrating the process of the invention it will be assumed that the catalyst in chambers 15 and 16 has declined in activity during a previous cycle of operation to a degree precluding the obtaining of an optimum commercially desirable conversion therein, and that the isomerization reaction is being carried out within chamber 17. The reaction products comprising isobutane, unconverted butane, and hydrogen chloride are removed from reaction chamber 17 through outlet line 24 and passed through line 29 and cooler 30 into an accumulator 31. In passing through cooler 30, the reaction products are cooled to a temperature sufficiently low to effect the condensation of butanes. If desired, additional cooling or refrigerating means not shown in the drawing may be provided to cool the reaction products prior to their entry into accumulator 31.

Liquid is drawn from accumulator 31 and forced by means of pump 33 through line 32 to a stripping column 34. Vapors and gases comprising hydrogen chloride are drawn from accumulator 31, through line 36, to compressor 37. From the high pressure side of compressor 37, the compressed stream is passed through line 38 into stripping column 34. Within stripping column 34, a gaseous fraction comprising hydrogen chloride is separated from a liquid fraction comprising isobutane and unreacted butane. A high pressure, for example in excess of about 300 lbs., is maintained within column 34 to aid in effecting the desired separation. A heating means, such as a closed heating coil 39, is provided in the lower part of column 34, and cooling means, such as a closed cooling coil 40, is provided in the upper part of the column. The gaseous fraction comprising hydrogen chloride is eliminated from the top of column 34 through line 41 provided with valve 42, and passed through line 43, provided with valve 44, to a gas holder 45. Gas holder 45 is provided with a line 46, controlled by valve 47, for the introduction of hydrogen chloride from an outside source or for the elimination of gases therefrom. From gas holder 45, hydrogen chloride is passed in controlled amounts through valved lines 48 and 27 into line 14. Liquid comprising isobutane and unreacted butane is withdrawn from the bottom of column 34 and passed through line 49, provided with valve 50, into a fractionator 51. Fractionator 51 is provided with suitable heating means such as, for example, a reboiler or a heating coil 55 in the lower part thereof. Within fractionator 51 a vapor fraction comprising isobutane is separated from a liquid fraction comprising normal butane. The liquid fraction is withdrawn from fractionator 51 through line 62, provided with valve 63, and eliminated from the system. A part or all of the liquid fraction thus drawn from fractionator 51 may be forced through line 64, by means of pump 65, into line 14.

Vapors comprising isobutane are withdrawn overhead from fractionator 51 and passed through line 52, provided with cooler 53, to an accumulator 54. In passing through cooler 53, the stream is cooled to a temperature sufficiently low to effect the condensation of isobutane. Isobutane is drawn from accumulator 54 through line 57, controlled by valve 58, as a final product. A part of the liquid, drawn from accumulator 54 through line 57, is forced by means of pump 59 through line 60, as reflux, to the fractionator 51.

While the isomerization of butane is being effected within chamber 17, the spent catalyst in chamber 15 is subjected to a treating operation to simultaneously recover the adsorptive alumina support and produce anhydrous hydrogen chloride for the process. This is effected by the passage of water vapor through line 70 controlled by valve 71, heater 72, and valved lines 73 and 18, into chamber 15. The presence of liquid water within chamber 15 is avoided by superheating the water vapor in its passage through heater 72, and by the use of any other conventional means not shown in the drawing for applying heat to the catalyst. As shown above, the treatment is preferably effected at a temperature in excess of 150° C. and at a pressure not substantially in excess of that required to maintain a gaseous flow through the catalyst chamber. Under these conditions, a steady stream of anhydrous hydrogen chloride will be evolved from the catalyst in chamber 15.

Chambers 15, 16 and 17 are provided with outlets 75, 76 and 77 for the hydrogen chloride formed during the catalyst treatment. These outlets are led to a valved line in the form of a closed loop 78. By proper control of the valves in loop 78, the anhydrous hydrogen chloride can be passed from chamber 15, through lines 75, 78 and 79, to compressor 80. From the high pressure side of compressor 80, the anhydrous hydrogen chloride is passed through line 27 and into line 14, carrying the fresh butane charge to the system. If the hydrogen chloride is produced in an amount exceeding the immediate requirement for the isomerization reaction, the excess may be passed through valved line 48 into gas holder 45. If desired, the hydrogen chloride may be passed directly from loop 78, through line 82 and valved line 83, into the reactants flowing through line 20, into chamber 17. A heat exchanger is provided in line 82 to cool or heat the hydrogen halide promoter flowing therethrough. Additional pumping means not shown in the drawing may be provided to aid in passing the promoter to the reaction zone.

The treatment of the catalyst in chamber 15 is continued until water begins to appear in the hydrogen chloride reaction product. About 75% to 85% of the potentially available hydrogen chloride will then have been recovered from the catalyst in chamber 15.

When water begins to appear in the gaseous product leaving chamber 15, the gaseous stream is passed through the spent catalyst within chamber 16 prior to its passage to chamber 17. This is accomplished by passing the stream from loop 78 through line 84, heat exchanger 85 and valved line 86, into line 19 entering chamber 16. In passing through chamber 16, the water vapor in the hydrogen chloride stream reacts with the aluminum chloride, thereby producing additional hydrogen chloride while dehydrating the stream. The resulting anhydrous hydrogen chloride is passed from chamber 16 to chamber 17 or gas holder 45, as described above. The passage of water vapor successively through chambers 15 and 16 is continued until substantially all of the potentially available hydrogen chloride has been removed from the catalyst in chamber 15. The water vapor is thereupon introduced directly into chamber 16 and the remaining catalyst material in chamber 15, substantially free of aluminum chloride, is regenerated.

The extreme flexibility of the improved process of the invention permits of wide variations in the method of operation to attain advantages not inherent in processes available heretofore. Thus, if desired, the catalyst treating step may comprise the simultaneous dehydration of the charge to the system, thereby eliminating the need for driers 13. This is accomplished by by-passing driers 13 by means of valves 12 and 87, and line 88, and passing the butane charge into chamber 15, wherein the catalyst treatment is being effected. The resulting anhydrous stream leaving chamber 15 and comprising butane and hydrogen chloride is then passed to chamber 17 to effect the isomerization reaction. Under certain conditions of operation moisture may present itself in the hydrogen chloride recycled within the system. If such be the case the recycled hydrogen chloride flowing through line 27 is bypassed through line 89 controlled by valve 90 and passed into line 70 to join the water vapor passing therethrough to the spent catalyst being treated.

Aqueous hydrogen chloride produced, for example, by scrubbing hydrogen chloride with water from any products eliminated from the system or obtained from any suitable source, may be dehydrated during the catalyst treating step of the process. The aqueous hydrogen chloride is introduced into the system through line 70 leading to the chamber wherein spent catalyst is being treated.

During the course of the operation a certain amount of fixed gases comprising, for example, any one or several of such compounds as hydrogen, methane, ethane, ethylene, propane, propylene, etc., will build up within the system as a result of side reactions, or in some cases, due to their express addition to the charge. These gases may be eliminated from any suitable part of the system, for example, from accumulator 31 through valved line 100. The gas or gases thus eliminated from the system will contain a considerable amount of the hydrogen halide promoter, loss of which seriously detracts from the economical operation process. A particular advantage of the process of the invention resides in the fact that it brings within the realm of practicability the utilization, in processes employing the hydrogen halide promoter only in the anhydrous state, the highly economical method of recovering the hydrogen halide from the eliminated waste gases by scrubbing with water. The fixed gases removed from accumulator 31 through line 100, at times optionally in combination with part, or all, of the gases flowing through line 43, are forced by means of compressor 101 through line 102 into the lower part of scrubber 103. Water introduced into the upper part of scrubber 103 through valved line 104 passes downwardly through scrubber 103, selectively adsorbing the hydrogen halide from the gas. Waste gases substantially free of hydrogen chloride are eliminated overhead from scrubber 103 through valved line 105. Aqueous hydrogen chloride is withdrawn from the bottom of the scrubber through valved line 106 and forced in part or in its entirety by means of pump 107 through line 108 into line 70 to be used as at least a part of the aqueous medium in the spent catalyst treating step during which the hydrogen chloride is recovered in the anhydrous form.

Valved outlets 91, 97, 98 and 99 are provided to eliminate from the system any fluid comprising, for example, a heating or flushing medium, etc., used during any additional intermediate step which may be resorted to during the operation of the process.

When substantially all of the available hydrogen chloride has been recovered from the spent catalyst in chamber 15, this chamber is cut out of the treating cycle and the recovered adsorptive alumina therein is subjected to a catalyst regeneration operation. This may comprise a heating of the recovered adsorptive alumina in situ by any suitable means to effect its substantial dehydration and to decompose any hydrates of aluminum chloride which may have been formed during the catalyst treatment. Upon completion of the heating operation, the alumina is reimpregnated with fresh aluminum chloride by the passage of aluminum chloride vapors therethrough. The aluminum chloride vapors may be introduced into chamber 15 by means of a valved inlet 96. Gaseous products formed during the heating or regeneration operation, or excess aluminum chloride vapors used during the impregnation step are removed through outlet 97.

When the activity of the catalyst in chamber 17 has declined to a degree where optimum conversions are no longer obtained, passage of reactants therethrough is stopped and a new operative cycle begun. The new cycle will comprise the utilization of chamber 15, containing regenerated catalyst, to effect the desired conversion, while treatment in situ of the spent catalyst in chamber 17 is begun.

The process of the invention has been described in detail herein in its application to the isomerization of butane. However, by the inclusion in the charge of suitable agents such as, for example, hydrogen, isobutane, etc., capable of suppressing undesired side reactions such as cracking, polymerization, and the like, the process of the invention may be advantageously employed for the isomerization of higher saturated hydrocarbons such as pentane, hexane, methyl cyclopentane, etc. The hydrocarbons capable of being treated in the process may be obtained in large quantities as individual compounds in a relatively pure state. The hydrocarbon treated, however, need not necessarily be a pure individual hydrocarbon, but may be a mixture of one or more hydrocarbons. Thus, the invention provides a practical process for converting the normal butane and normal pentane contents of commercial hydrocarbon mixtures such as are obtained from natural gases, petroleum distillates, cracked distillates, etc., to their valuable branched chain isomers. Especially suitable mixtures of hydrocarbons are the so-called butane-butylene fractions and pentane-amylene fractions from which unsaturated hydrocarbons have been substantially removed. Treatment of such mixtures obtained, for instance, as by-products in the sulfuric acid alkylation of isoparaffins, results in materially increasing their contents of branched chain isomers and converting them to suitable raw materials for re-use in the alkylation process. Technical butane and pentane fractions may be conveniently treated in accordance with the process of the invention and their content of branched chain isomers materially increased without loss due to decomposition and side reactions. Other mixtures of saturated hydrocarbons such as straight-run gasoline, casinghead gasoline, etc., containing appreciable quantities of normal butane, normal pentane, cyclohexane, methyl cyclopentane, or lower-boiling non-branched saturated hydrocarbons, may be advantageously treated to produce products which are suitable for alkylation of olefins and have superior ignition characteristics.

The hydrocarbon, or mixture of hydrocarbons, to be isomerized is preferably substantially free of materials which are particularly prone to undergo side reactions such as degradation, polymerization, etc., under the reaction conditions. Excessive quantities of olefins, diolefins, or other detrimental impurities which may be present in the hydrocarbon or hydrocarbon mixture to be treated may be removed by a suitable pretreatment such as by a mineral acid refining, hydrogenation, or the like.

The process of the invention is in no wise limited to the isomerization of hydrocarbons, but is applicable to a wide variety of processes wherein organic materials are treated with the aid of supported aluminum halide catalysts in the presence of anhydrous hydrogen halide promoters.

We claim as our invention:

1. In a hydrocarbon isomerization process wherein a plurality of elongated beds of catalyst comprising anhydrous aluminum chloride and an adsorptive alumina are used to carry out simultaneously and alternately a hydrocarbon isomerization and a catalyst regeneration, said catalyst regeneration comprising the successive steps of recovering the adsorptive alumina in situ and reimpregnating the recovered adsorptive alumina with fresh aluminum chloride, the combination of steps which comprises passing a vaporized saturated isomerizable hydrocarbon under isomerizing conditions through one of said catalyst beds containing active catalyst, passing superheated water vapor through a bed of said catalyst which has been at least partly spent during a previous isomerization operation of the process cycle, thereby causing aluminum chloride and water vapor to react with the formation of anhydrous hydrogen chloride, and admixing the resulting anhydrous hydrogen chloride with the isomerizable hydrocarbon passed to said bed of active catalyst material.

2. In a hydrocarbon isomerization process wherein a plurality of elongated beds of catalyst comprising an anhydrous aluminum halide and an adsorptive alumina are used to carry out simultaneously and alternately a hydrocarbon isomerization and a catalyst regeneration, said catalyst regeneration comprising the successive steps of recovering the adsorptive alumina in situ and reimpregnating the recovered adsorptive alumina with fresh aluminum halide, the combination of steps which comprises passing a vaporized saturated isomerizable hydrocarbon under isomerizing conditions through one of said catalyst beds containing active catalyst, passing superheated water vapor through a bed of said catalyst which has been at least partly spent during a previous isomerization operation of the process cycle, thereby causing aluminum halide and water vapor to react with the formation of anhydrous hydrogen halide, and admixing the resulting anhydrous hydrogen halide with the isomerizable hydrocarbon passed to said bed of active catalyst material.

3. In a hydrocarbon isomerization process wherein a plurality of elongated beds of catalyst comprising anhydrous aluminum chloride and an adsorptive support material are used to carry out simultaneously and alternately a hydrocarbon isomerization and a catalyst regeneration, said catalyst regeneration comprising the successive steps of recovering the adsorptive support material in situ and reimpregnating the recovered adsorptive material with fresh anhydrous aluminum chloride, the combination of steps which comprises passing a vaporized saturated isomerizable hydrocarbon under isomerizing conditions through one of said catalyst beds containing active catalyst, passing superheated water vapor through a bed of said catalyst which has been at least partly spent during a previous isomerization operation of the process cycle, thereby causing aluminum chloride and water vapor to react with the formation of anhydrous hydrogen chloride, and admixing said anhydrous hydrogen chloride with the hydrocarbon passed to said bed of active catalyst.

4. In a hydrocarbon isomerization process wherein a plurality of elongated beds of catalyst comprising an anhydrous aluminum halide and an adsorptive support material are used to carry out simultaneously and alternately a hydrocarbon isomerization and a catalyst regeneration, said catalyst regeneration comprising the successive steps of recovering the adsorptive support material in situ and reimpregnating the recovered adsorptive material with fresh anhydrous aluminum halide, the combination of steps which comprises passing a vaporized saturated isomerizable hydrocarbon under isomerizing conditions through one of said catalyst beds containing active catalyst, passing superheated water vapor through a bed of said catalyst which has been at least partly spent during a previous isomerization operation of the process cycle, thereby causing aluminum halide and water vapor to react with the formation of anhydrous hydrogen halide, and admixing said anhydrous hydrogen halide with the hydrocarbon passed to said bed of active catalyst.

5. In a hydrocarbon isomerization process wherein a plurality of elongated beds of catalyst comprising anhydrous aluminum chloride and an adsorptive alumina are used to carry out simultaneously and alternately a hydrocarbon isomerization and a catalyst regeneration, said catalyst regeneration comprising the successive steps of recovering the adsorptive alumina in situ and reimpregnating the recovered adsorptive alumina with fresh aluminum chloride, the combination of steps which comprises passing a vaporized saturated isomerizable hydrocarbon under isomerizing conditions through one of said beds containing active catalyst, separating a gaseous fraction comprising fixed gases and hydrogen chloride from the isomerization products, scrubbing said gaseous fraction with water to selectively remove hydrogen chloride by solution therefrom, passing the resulting aqueous hydrogen chloride solution as a superheated vapor through a bed of said catalyst which has been at least partly spent during a previous isomerization operation of the process cycle, thereby causing aluminum chloride and water vapor to react with the formation of anhydrous hydrogen chloride, and admixing the resulting anhydrous hydrogen chloride with the isomerizable hydrocarbon passed to said bed of active catalyst material.

6. In a hydrocarbon isomerization process wherein a plurality of elongated beds of catalyst comprising anhydrous aluminum chloride and an adsorptive support material are used to carry out simultaneously and alternately a hydrocarbon isomerization and a catalyst regeneration, said catalyst regeneration comprising the successive steps of recovering the adsorptive support material in situ and reimpregnating the recovered adsorptive support material with fresh aluminum chloride, the combination of steps which comprises passing a vaporized saturated isomerizable hydrocarbon under isomerizing conditions through one of said beds containing active catalyst, separating a gaseous fraction comprising fixed gases and hydrogen chloride from the isomerization products, scrubbing said gaseous fraction with water to selectively remove hydrogen chloride by solution therefrom, passing the resulting aqueous hydrogen chloride solution as a superheated vapor through a bed of said catalyst which has been at least partly spent during a previous isomerization operation of the process cycle, thereby causing aluminum chloride and water vapor to react with the formation of anhydrous hydrogen chloride, and admixing the resulting anhydrous hydrogen chloride with the isomerizable hydrocarbon passed to said bed of active catalyst material.

7. In a hydrocarbon isomerization process wherein a plurality of elongated beds of catalyst comprising an anhydrous aluminum halide, and an adsorptive support material are used to carry out simultaneously and alternately a hydrocarbon isomerization and a catalyst regeneration, said catalyst regeneration comprising the successive steps of recovering the adsorptive support material in situ and reimpregnating the recovered adsorptive support material with fresh anhydrous aluminum halide, the combination of steps which comprises passing a vaporized saturated isomerizable hydrocarbon under isomerizing conditions through one of said beds containing active catalyst, separating a gaseous fraction comprising fixed gases and hydrogen halide from the isomerization products, scrubbing said gaseous fraction with water to selectively remove hydrogen halide by solution therefrom, passing the resulting aqueous hydrogen halide solution as a superheated vapor through a bed of said catalyst which has been at least partly spent during a previous isomerization operation of the process cycle, thereby causing aluminum halide and water vapor to react with the formation of anhydrous hydrogen halide, and admixing the resulting anhydrous hydrogen halide with the isomerizable hydrocarbon passed to said bed of active catalyst material.

8. In a hydrocarbon conversion process wherein a plurality of elongated beds of catalyst comprising an anhydrous aluminum halide and an adsorptive support material are used to carry out simultaneously and alternately a hydrocarbon conversion and a catalyst regeneration, said catalyst regeneration comprising the successive steps of recovering the adsorptive support material in situ and reimpregnating the recovered adsorptive support material with fresh aluminum halide, the combination of steps which comprises passing a hydrocarbon vapor under isomerizing conditions through one of said beds containing active catalyst, separating a gaseous fraction comprising fixed gases and hydrogen halide from the conversion products, scrubbing said gaseous fraction with water to selectively remove hydrogen halide by solution therefrom, passing the resulting aqueous hydrogen halide solution as a superheated vapor through a bed of said catalyst which has been at least partly spent during a previous conversion operation of the process cycle, thereby causing aluminum halide and water vapor to react with the formation of anhydrous hydrogen halide, and admixing the resulting anhydrous hydrogen halide with the hydrocarbon passed to said bed of active catalyst material.

9. In a hydrocarbon isomerization process wherein a plurality of reaction zones each containing a catalyst comprising anhydrous aluminum chloride and adsorptive alumina are used to carry out simultaneously and alternately a hydrocarbon isomerization and a catalyst regeneration, said catalyst regeneration comprising the successive steps of recovering adsorptive alumina in situ and reimpregnating the recovered adsorptive alumina with fresh aluminum chloride, the combination of steps which comprises passing a vaporized saturated isomerizable hydrocarbon admixed with water vapor at a temperature sufficiently high and at a pressure sufficiently low to preclude the presence of liquid water through one of said reaction zones containing catalyst which has been at least partly spent during a previous isomerization operation of the process cycle, thereby causing aluminum chloride and water vapor to react with the formation of anhydrous hydrogen chloride, and passing the resulting mixture comprising the isomerizable hydrocarbon vapor and anhydrous hydrogen chloride under isomerizing conditions through one of said reaction zones containing active catalyst.

10. In a hydrocarbon isomerization process wherein a plurality of reaction zones each containing a catalyst comprising anhydrous aluminum chloride and adsorptive support material are used to carry out simultaneously and alternately a hydrocarbon isomerization and a catalyst regeneration, said catalyst regeneration comprising the successive steps of recovering adsorptive support material in situ and reimpregnating the recovered adsorptive support material with fresh aluminum chloride, the combination of steps which comprises passing a vaporized saturated isomerizable hydrocarbon admixed with water vapor at a temperature sufficiently high and at a pressure sufficiently low to preclude the presence of liquid water through one of said reaction zones containing catalyst which has been at least partly spent during a previous isomerization operation of the process cycle, thereby causing aluminum chloride and water vapor to react with the formation of anhydrous hydrogen chloride, and passing the resulting mixture comprising the isomerizable hydrocarbon vapor and anhydrous hydrogen chloride under isomerizing conditions through one of said reaction zones containing active catalyst.

11. In a hydrocarbon isomerization process wherein a plurality of reaction zones each containing a catalyst comprising an anhydrous aluminum halide and adsorptive support material are used to carry out simultaneously and alternately a hydrocarbon isomerization and a catalyst regeneration, said catalyst regeneration comprising the successive steps of recovering adsorptive support material in situ and reimpregnating the recovered adsorptive support material with fresh aluminum halide, the combination of steps which comprises passing a vaporized saturated isomerizable hydrocarbon admixed with water vapor at a temperature sufficiently high and at a pressure sufficiently low to preclude the presence of liquid water through one of said reaction zones containing catalyst which has been at least partly spent during a previous isomerization operation of the process cycle, thereby causing aluminum halide and water vapor to react with the formation of anhydrous hydrogen halide, and passing the resulting mixture comprising the isomerizable hydrocarbon vapor and anhydrous hydrogen halide under isomerizing conditions through one of said reaction zones containing active catalyst.

MARTIN DE SIMÓ.
HARRY A. CHENEY.